United States Patent
Lagudu et al.

(10) Patent No.: US 11,635,967 B2
(45) Date of Patent: Apr. 25, 2023

(54) VERTICAL AND HORIZONTAL BROADCAST OF SHARED OPERANDS

(71) Applicant: ADVANCED MICRO DEVICES, INC., Santa Clara, CA (US)

(72) Inventors: Sateesh Lagudu, Hyderabad (IN); Allen H. Rush, Santa Clara, CA (US); Michael Mantor, Orlando, FL (US); Arun Vaidyanathan Ananthanarayan, Hyderabad (IN); Prasad Nagabhushanamgari, Hyderabad (IN); Maxim V. Kazakov, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/032,307

(22) Filed: Sep. 25, 2020

(65) Prior Publication Data
US 2022/0100528 A1    Mar. 31, 2022

(51) Int. Cl.
  *G06F 15/80* (2006.01)
  *G06F 9/38* (2018.01)
  *G06F 13/28* (2006.01)
  *G06F 13/40* (2006.01)

(52) U.S. Cl.
  CPC ............ *G06F 9/3887* (2013.01); *G06F 13/28* (2013.01); *G06F 13/4027* (2013.01)

(58) Field of Classification Search
  None
  See application file for complete search history.

(56) References Cited

U.S. PATENT DOCUMENTS

| | | | |
|---|---|---|---|
| 9,390,057 B2 * | 7/2016 | Pechanek | G06F 15/17337 |
| 10,564,980 B2 | 2/2020 | Fleming, Jr. et al. | |
| 10,671,564 B2 | 6/2020 | Henry et al. | |
| 2002/0198911 A1 * | 12/2002 | Blomgren | G06F 15/80 |
| | | | 712/E9.034 |
| 2008/0071996 A1 * | 3/2008 | Ohmori | G06F 13/4022 |
| | | | 711/148 |

(Continued)

OTHER PUBLICATIONS

International Search Report and Written Opinion dated Jan. 4, 2022 for PCT/US21/051892 (200304-PCT), 11 pages.

*Primary Examiner* — Hyun Nam

(57) ABSTRACT

An array processor includes processor element arrays distributed in rows and columns. The processor element arrays perform operations on parameter values. The array processor also includes memory interfaces that broadcast sets of the parameter values to mutually exclusive subsets of the rows and columns of the processor element arrays. In some cases, the array processor includes single-instruction-multiple-data (SIMD) units including subsets of the processor element arrays in corresponding rows, workgroup processors (WGPs) including subsets of the SIMD units, and a memory fabric configured to interconnect with an external memory that stores the parameter values. The memory interfaces broadcast the parameter values to the SIMD units that include the processor element arrays in rows associated with the memory interfaces and columns of processor element arrays that are implemented across the SIMD units in the WGPs. The memory interfaces access the parameter values from the external memory via the memory fabric.

15 Claims, 4 Drawing Sheets

(56) References Cited

U.S. PATENT DOCUMENTS

| | | | |
|---|---|---|---|
| 2009/0210652 A1* | 8/2009 | Duller | G06F 15/17375 |
| | | | 712/16 |
| 2011/0164174 A1* | 7/2011 | Limberg | H04L 1/0057 |
| | | | 348/E7.001 |
| 2013/0019082 A1 | 1/2013 | Pechanek | |
| 2015/0067302 A1* | 3/2015 | Gueron | G06F 9/3887 |
| | | | 712/210 |
| 2018/0314941 A1 | 11/2018 | Lie et al. | |
| 2019/0377580 A1 | 12/2019 | Vorbach et al. | |

* cited by examiner

VERTICAL AND HORIZONTAL BROADCAST OF SHARED OPERANDS

BACKGROUND

Graphics processing units (GPUs) and other multi-threaded processing units typically implement multiple processing elements (which are also referred to as processor cores or compute units) that concurrently execute multiple instances of a single program on multiple data sets. For example, the processing elements can implement single-instruction-multiple-data (SIMD) protocols to concurrently execute the same instruction on multiple data sets using multiple compute units. The processing elements are therefore referred to as SIMD units. A hierarchical execution model is used to match the hierarchy implemented in hardware. The execution model defines a kernel of instructions that are executed by all the waves (also referred to as wavefronts, threads, streams, or work items). In some cases, the processing power of the GPUs or other multithreaded processing units implemented in a processing system is supplemented with one or more accelerators that also implement SIMD protocols. One example of an accelerator circuit that is implemented in GPUs or other multithreaded processing units is an array processor.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
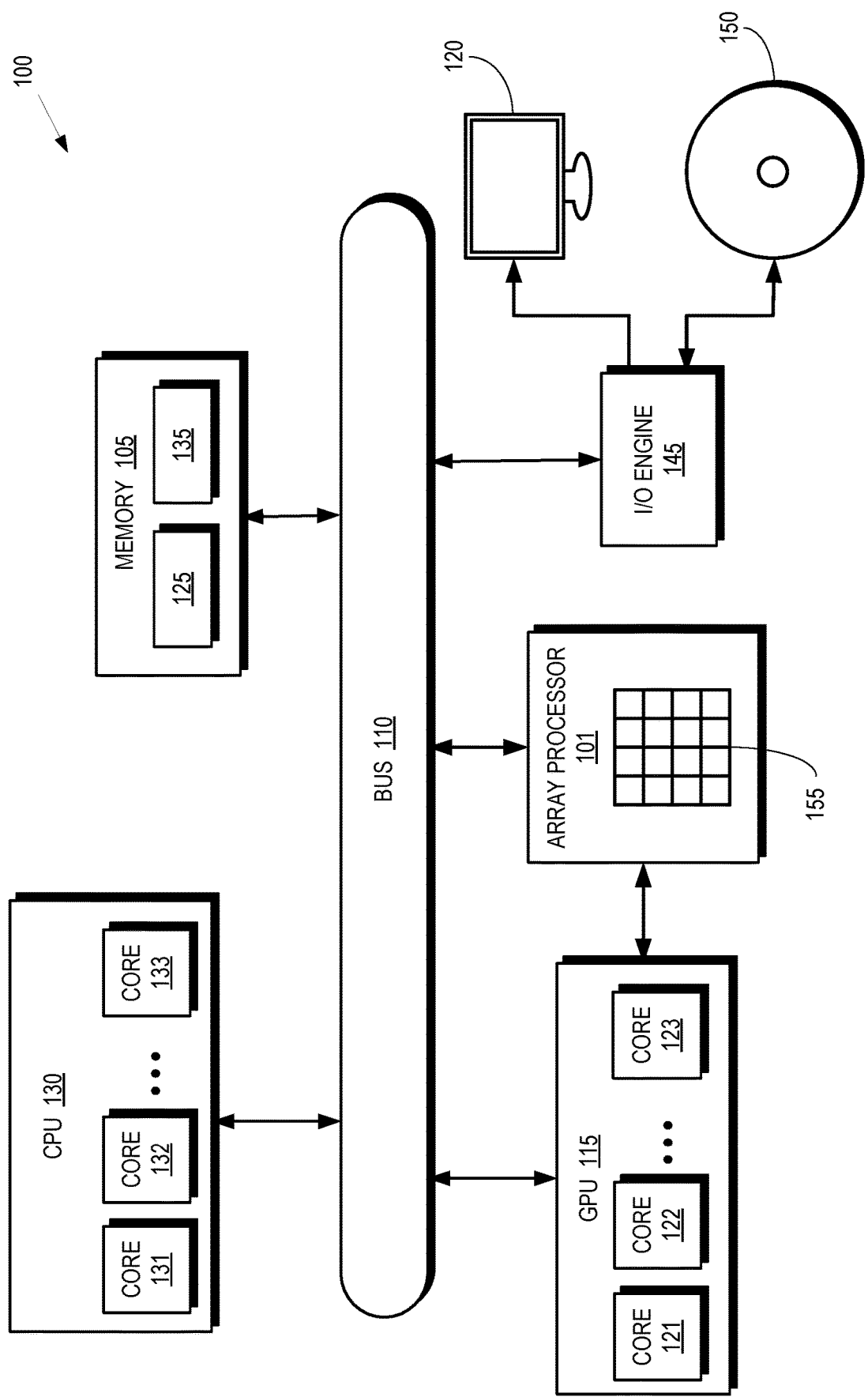
FIG. 1 is a block diagram of a processing system that performs vertical and horizontal broadcast of shared operands in an array processor according to some embodiments.

An array processor system includes one or more workgroup processors (WGPs) that include a set of SIMD units. For example, an array processor can include four WGPs that each implement four SIMD units. A SIMD unit includes a set of processor element arrays that perform vector operations such as multiply-accumulate operations on vectors or matrices. For example, a SIMD unit can include four processor element arrays in each of the processor element arrays includes an 8×8 array of circuits to perform operations (such as multiply-accumulate operations) on a pair of input vectors. As used herein, the term "vector" can also refer to individual rows or columns of matrices. Furthermore, the term "matrix" refers generally to arrays of values including vectors, which are understood as 1×N matrices. The processor element arrays in the array processor system perform kernel operations, such as a matrix multiplication, on matrices having dimensions that correspond to the number of processor element arrays. For example, an array processor that includes four WGP including four SIMD units made up of four processor element arrays can multiply 64×64 matrices.

Input values for the kernel operations performed by the processor element arrays are retrieved from memory by one or more direct memory access (DMA) engines via a memory fabric and the DMA engines write output values back to the memory via the memory fabric. For example, each of the four WGP can include a pair of DMA engines that fetch values for corresponding pairs of SIMD units. Many of the kernel operations performed on matrices by the array processor system reuse the same parameter values over and over. For example, a multiply-accumulate operation used to implement a machine learning application can reuse the same vector or matrix values several times when performing a vector or matrix multiplication. Repeatedly prefetching the same parameters consumes significant memory bandwidth in the array processor system and reduces the efficiency of the array processor system as the system becomes bandwidth limited.

FIGS. 1-4 disclose embodiments of an array processor system that uses direct memory access (DMA) engines to broadcast sets of parameter values to processor element arrays in mutually exclusive rows and columns of the array processor system, thereby reducing bandwidth consumed by fetching parameters into the processor element arrays. The processor element arrays are implemented as vector arithmetic logic unit (ALU) processors. In some embodiments, each DMA engine broadcasts parameter values to one row of processor element arrays and one column of processor element arrays. If the array processor system supports multiple workgroup processors (WGPs), each DMA engine broadcasts parameter values to a row of processor element arrays implemented in the SIMD units associated with the DMA engine and a column of processor element arrays implemented across the SIMD units of the WGPs. For example, a first DMA engine broadcasts parameter values to a first row of processor element arrays and a first column of processor element arrays, a second DMA engine broadcasts parameter values to a second row of processor element arrays and a second column of processor element arrays, a third DMA engine broadcasts parameter values to a third row of processor element arrays and the third column a processor element arrays, etc. Associating the DMA engines with mutually exclusive sets of rows/columns allows concurrent population of registers holding the input values for the different processor element arrays. The bandwidth of the memory fabric consumed by fetching reused parameter values is therefore reduced and the efficiency of the array processor system is increased.

FIG. 1 is a block diagram of a processing system 100 that performs vertical and horizontal broadcast of shared operands in an array processor 101 according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a GPU 115, in accordance with some embodiments. The GPU 115 renders images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that execute instructions concurrently or in parallel. Some embodiments of the processor cores 121-123 operate as SIMD units that perform the same operation on different data sets. The number of processor cores 121-123 implemented in the GPU 115 is a matter of design choice and some embodiments of the GPU 115 include more or fewer processor cores than shown in FIG. 1. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. Some embodiments of the processor cores 131-133 operate as SIMD units that perform the same operation on different data sets. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The array processor 101 supplements the processing power of the GPU 115 and, in some cases, the CPU 130. A set 155 of processor element arrays are used to perform operations that accelerate or improve the performance of the GPU 115 by allowing the GPU 115 to offload tasks to one or more of the processor element arrays in the set 155. The processor element arrays then return results to the GPU 115. In some embodiments, the processor element arrays are implemented as vector arithmetic logic units (ALUs) that include circuitry to perform arithmetic and bitwise operations on integer binary numbers. The processor element arrays therefore receive one or more inputs (or operands) and generate corresponding outputs based on the operands and an opcode that indicates the operation that is performed by the processor element array. The operands, opcodes, and other status values are stored in registers associated with the processor element arrays.

The processor element arrays in the set 155 are distributed in rows and columns. As discussed below, the array processor 101 also includes memory interfaces that read parameter values (e.g., from the memory 105) and broadcast sets of the parameter values to mutually exclusive subsets of the rows and columns of the processor element arrays. In some cases, the array processor 101 includes single-instruction-multiple-data (SIMD) units including subsets of the processor element arrays in corresponding rows, workgroup processors (WGPs) including subsets of the SIMD units, and a memory fabric configured to interconnect with an external memory (e.g., the memory 105) that stores the parameter values. The memory interfaces broadcast the parameter values to the SIMD units that include the processor element arrays in rows associated with the memory interfaces and columns of processor element arrays that are implemented across the SIMD units in the WGPs. The memory interfaces access the parameter values from the external memory via the memory fabric.

Figure 2:
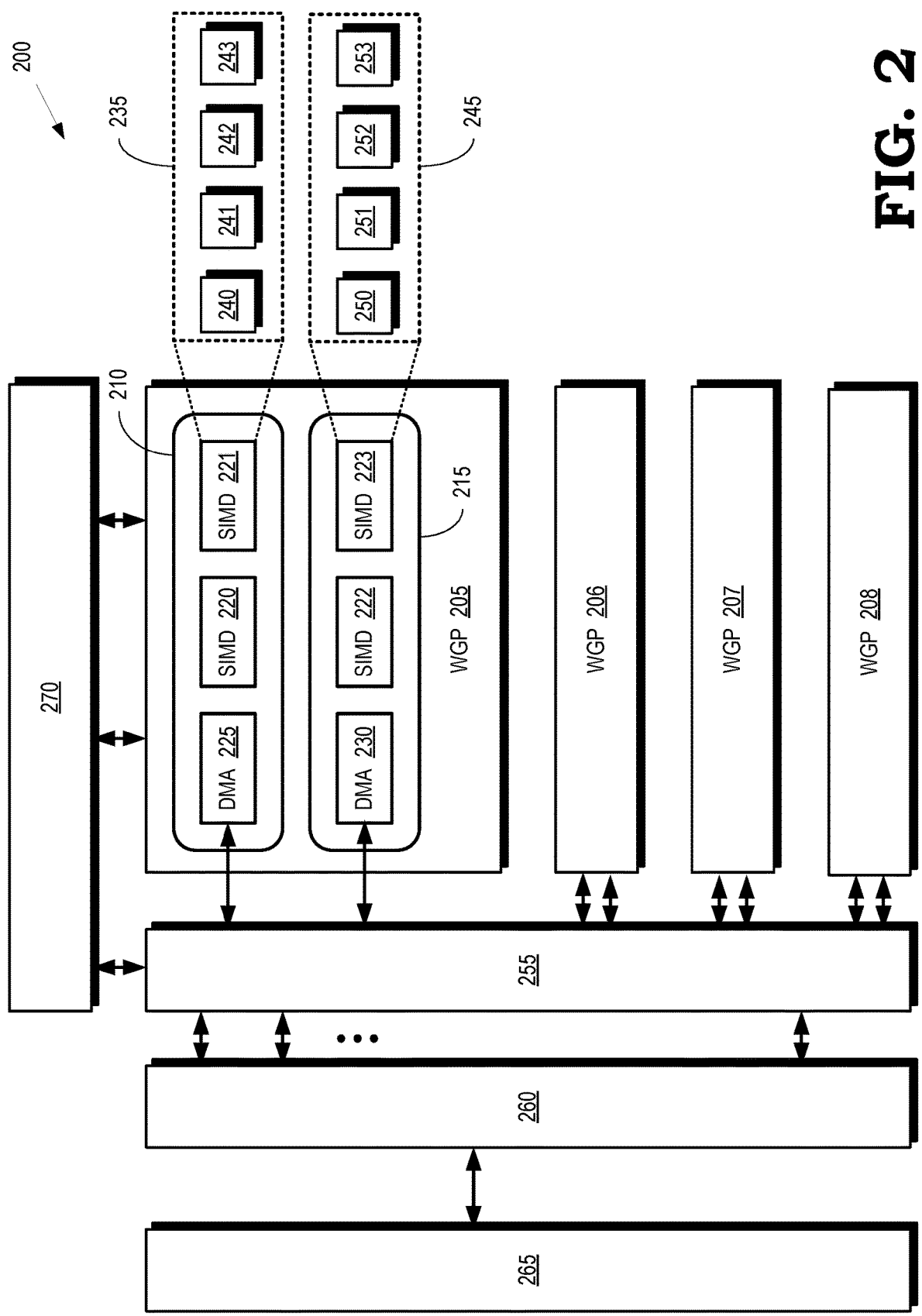
FIG. 2 is a block diagram of a portion of a processing system that supports vertical and horizontal broadcasting of parameter values according to some embodiments.

FIG. 2 is a block diagram of a portion 200 of a processing system that supports vertical and horizontal broadcasting of parameter values according to some embodiments. The portion 200 is used to implement some embodiments of the array processor 101 shown in FIG. 1. The portion 200 includes a set of WGPs 205, 206, 207, 208 (collectively referred to herein as "the WGP 205-208") that implement pairs of compute units 210, 215. The compute units 210, 215 are only illustrated in the WGP 205 in the interest of clarity, although the WGP 206-208 also include pairs of compute units. Some embodiments of the portion 200 implement more or fewer WGP and corresponding compute units.

The WGP 205-208 include SIMD units 220, 221, 222, 223 (collectively referred to herein as "the SIMD units 220-223") and memory interfaces such as direct memory access (DMA) engines 225, 230. Some embodiments of the memory interfaces also include TA/TD logic and TCP interfaces that operate in conjunction with the DMA engines 225, 230. Each of the SIMD units 220-223 implements a portion of a set of processor element arrays. In the illustrated embodiment, the SIMD unit 221 includes a subset 235 of processor element arrays 240, 241, 242, 243 (collectively referred to herein as "the processor element arrays 240-243") and the SIMD unit 223 includes a subset 245 of processor element arrays 250, 251, 252, 253 (collectively referred to herein as "the processor element arrays 250-253"). The SIMD units 220, 222 also include other subsets of processor element arrays that are not shown in FIG. 2 in the interest of clarity.

The DMA engines 225, 230 are connected to a memory fabric 255 that provides one or more channels between the DMA engines 225, 230 and a random-access memory (RAM) such as an SRAM 260. In the illustrated embodiment, the SRAM 260 is connected to a system memory 265 such as the memory 105 shown in FIG. 1. The portion 200 also includes an asynchronous compute engine 270 that communicates with the WGP 205-208 and the memory fabric 255.

The DMA engines 225, 230 fetch parameter values from the SRAM 260 or the system memory 265 via the memory fabric 255. The fetched parameter values are then broadcast to mutually exclusive subsets of the processor element arrays including the processor element arrays 240-243, 250-253. In some embodiments, the DMA engines 225, 230 broadcast the parameter values to processor element arrays in corresponding rows and columns of the set of processor element arrays. For example, the DMA engine 225 can broadcast first parameter values to the processor element arrays in a first row (e.g., the row including the processor element arrays 240-243) and a first column (e.g., the column including the processor element arrays 240, 250). The DMA engine 230 can broadcast second parameter values to the processor element arrays in a second row (e.g., the processor element arrays 250-253) and a second column (e.g., the processor element arrays 241, 251). In this case, the subset of processor element arrays 240-243 and one row is mutually exclusive to the subset of the processor element arrays 250-253 in another row. The subset of processor element arrays in the column that includes the processor element arrays 240, 250 is mutually exclusive to the subset of processor element arrays in the column that includes the processor element arrays 241, 251. Thus, the DMA engines 225, 230 concurrently populate registers associated with the processor element arrays in the mutually exclusive subsets of the rows and columns with their corresponding fetched parameter values.

Figure 3:
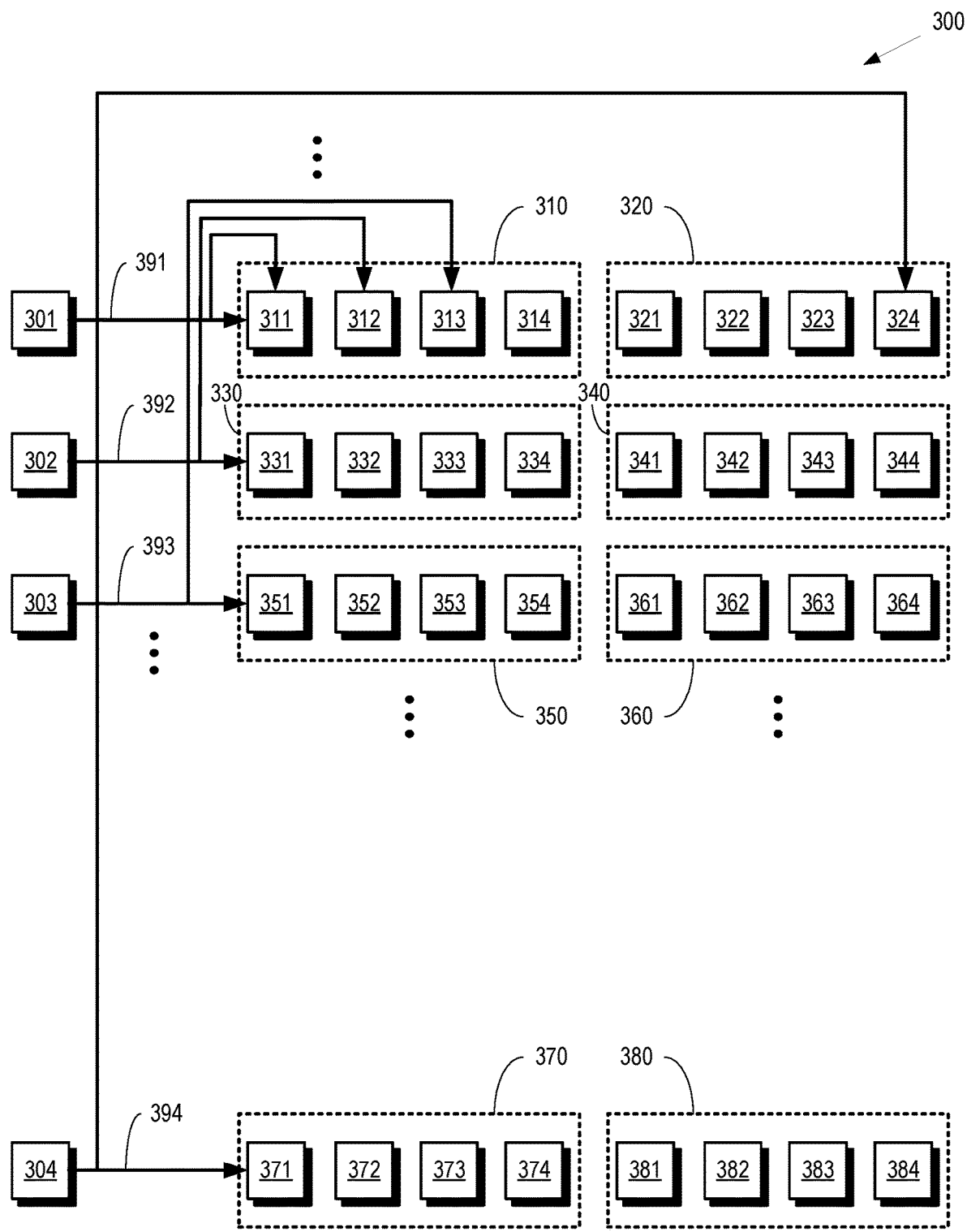
FIG. 3 is a block diagram of an array processor that implements vertical and horizontal broadcasting of parameter values to mutually exclusive subsets of processor element arrays according to some embodiments.

FIG. 3 is a block diagram of an array processor 300 that implements vertical and horizontal broadcasting of parameter values to mutually exclusive subsets of processor element arrays according to some embodiments. The array processor 300 is used to implement some embodiments of the array processor 101 shown in FIG. 1. The array processor 300 includes DMA engines 301, 302, 303, 304 (collectively referred to herein as "the DMA engines 301-304") that fetch parameters from a memory such as the memory 105 shown in FIG. 1 or the memories 260, 265 shown in FIG. 2. The array processor 300 also includes SIMD units 310, 320, 330, 340, 350, 360, 370, 380 that are implemented using corresponding subsets of processor element arrays 311, 312, 313, 314, 321, 322, 323, 324, 331, 332, 333, 334, 341, 342, 343, 344, 351, 352, 353, 354, 361, 362, 363, 364, 371, 372, 373, 374, 381, 382, 383, and 384 (collectively referred to herein as "the processor element arrays 311-384" for the sake of brevity so the hyphen is not intended to indicate a continuous sequence of numerals between 311 and 384). Some embodiments of the SIMD units 310, 320, 330, 340, 350, 360, 370, 380 are implemented in different WGPs. For example, a first WGP can implement the SIMD unit 310, 320, a second WGP can implement the SIMD units 330, 340, a third WGP can implement the SIMD units 350, 360, and a fourth WGP can implement the SIMD units 370, 380.

The DMA engines 301-304 are interconnected with mutually exclusive subsets of the processor element arrays 311-384. In the illustrated embodiment, the DMA engines 301-304 are interconnected to mutually exclusive rows and columns in the array of processor element arrays 311-384 using physical connections include wires, traces, and the like. The DMA engine 301 is connected to a row including the processor element arrays 311-314, 321-324 and a column including the processor element arrays 311, 331, 351, 371 by a physical connection 391. The DMA engine 301 can therefore broadcast parameter values fetched from the memory to the processor element arrays 311-314, 321-324, the processor element arrays 311, 331, 351, 371, subsets of these processor element arrays, or a combination thereof. The DMA engine 302 is connected to a row including the processor element arrays 331-334, 341-344 and a column including the processor element arrays 312, 332, 352, 372 by a physical connection 392. The DMA engine 302 can therefore broadcast parameter values fetched from the memory to the processor element arrays 331-334, 341-344, the processor element arrays 312, 332, 352, 372, subsets of these processor element arrays, or a combination thereof. The DMA engine 303 is connected to a row including the processor element arrays 351-354, 361-364 and a column including the processor element arrays 313, 333, 353, 373 by a physical connection 393. The DMA engine 303 can therefore broadcast parameter values fetched from the memory to the processor element arrays 351-354, 361-364, the processor element arrays 313, 333, 353, 373, subsets of these processor element arrays, or a combination thereof. The DMA engine 304 is connected to a row including the processor element arrays 371-374, 381-384 and a column including the processor element arrays 324, 344, 364, 384 by a physical connection 394. The DMA engine 304 can therefore broadcast parameter values fetched from the memory to the processor element arrays 371-374, 381-384, the processor element arrays 324, 344, 364, 384, subsets of these processor element arrays, or a combination thereof.

Figure 4:
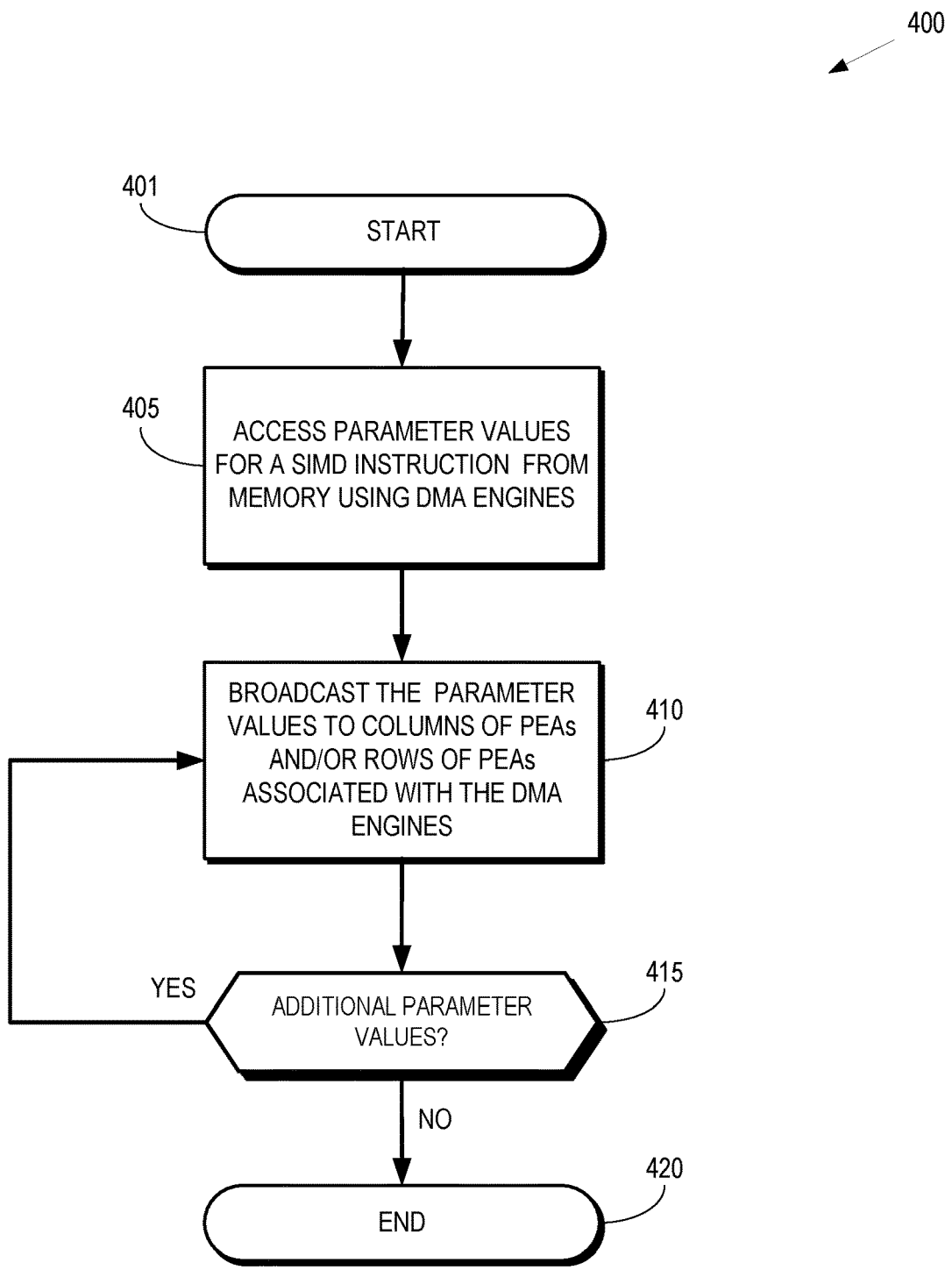
FIG. 4 is a flow diagram of a method of broadcasting parameter values to rows or columns of processor element arrays according to some embodiments.

FIG. 4 is a flow diagram of a method 400 of broadcasting parameter values to rows or columns of processor element arrays according to some embodiments. The method 400 is implemented in some embodiments of the processing system 100 shown in FIG. 1, the portion 200 of the processing system shown in FIG. 2, and the array processor 300 shown in FIG. 3.

The method 400 begins at the block 401. At block 405, one or more memory interfaces (such as DMA engines) access corresponding parameter values for a SIMD instruction from a memory. At block 410, the DMA engines broadcast the parameter values to mutually exclusive columns or rows of the processor element arrays. As discussed herein, the DMA engines broadcast the parameter values using physical interconnections between the DMA engines and the mutually exclusive subsets of columns or rows of the processor element arrays.

At decision block 415, the system determines whether additional parameter values are to be fetched from the memory. If so, the method 400 flows back to the block 405 and the additional parameter values are fetched from the memory. If there are no additional parameter values to fetch, the method 400 flows to the block 420 and the method 400 ends.

In some embodiments, the apparatus and techniques described above are implemented in a system including one or more integrated circuit (IC) devices (also referred to as integrated circuit packages or microchips), such as the array processor described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
processor element arrays distributed in rows and columns, wherein the processor element arrays are configured to perform operations on parameter values;
memory interfaces configured to broadcast sets of the parameter values to mutually exclusive subsets of the rows and columns of the processor element arrays;
single-instruction-multiple-data (SIMD) units that comprise subsets of the processor element arrays in corresponding rows, wherein the memory interfaces broadcast the parameter values to the SIMD units comprising the processor element arrays in rows associated with the memory interfaces; and
workgroup processors comprising subsets of the SIMD units, wherein the memory interfaces broadcast the parameter values to columns of processor element arrays that are implemented across the SIMD units in the workgroup processors.

2. The apparatus of claim 1, wherein the processor element arrays comprise vector arithmetic logic unit (ALU) processors, and wherein the memory interfaces comprise direct memory access (DMA) engines.

3. The apparatus of claim 1, wherein each of the memory interfaces broadcasts the parameter values to the processor element arrays in a corresponding one of the rows and a corresponding one of the columns.

4. The apparatus of claim 3, wherein a first memory interface of the memory interfaces broadcasts first parameter values to the processor element arrays in a first row and a first column, and wherein a second memory interface of the memory interfaces broadcasts second parameter values to the processor element arrays in a second row and a second column.

5. The apparatus of claim 1, wherein the memory interfaces are connected to the mutually exclusive subsets of rows and columns of the processor element arrays via separate physical connections.

6. The apparatus of claim 1, wherein the memory interfaces are configured to concurrently populate registers associated with the processor element arrays in the mutually exclusive subsets of the rows and columns with the parameter values.

7. The apparatus of claim 1, further comprising:
a memory fabric configured to interconnect with an external memory that stores the parameter values, and wherein the memory interfaces are configured to access the parameter values from the external memory via the memory fabric.

8. A method comprising:
fetching, via memory interfaces, parameter values from a memory;
broadcasting, from the memory interfaces, the parameter values to mutually exclusive subsets of rows and columns of processor element arrays; and performing, at the processor element arrays, operations on the parameter values,
  wherein subsets of the processor element arrays in each row are implemented in corresponding single-instruction-multiple-data (SIMD) units, and broadcasting the parameter values comprises broadcasting the parameter values to the SIMD units comprising the processor element arrays in rows associated with the memory interfaces, and
  wherein subsets of the SIMD units are implemented in corresponding workgroup processors, and broadcasting the parameter values comprises broadcasting the parameter values to columns of the processor element arrays that are implemented across the SIMD units in the workgroup processors.

9. The method of claim 8, wherein the processor element arrays comprise vector arithmetic logic unit (ALU) processors, and wherein the memory interfaces comprise direct memory access (DMA) engines.

10. The method of claim 8, wherein broadcasting the parameter values from the memory interfaces comprises broadcasting the parameter values from each of the memory interfaces to the processor element arrays in a corresponding one of the rows and a corresponding one of the columns.

11. The method of claim 10, wherein broadcasting the parameter values comprises broadcasting first parameter values from a first memory interface of the memory interfaces to the processor element arrays in a first row and a first column, and wherein broadcasting the parameter values comprises broadcasting second parameter values from a second memory interface of the memory interfaces to the processor element arrays in a second row and a second column.

12. The method of claim 8, wherein broadcasting the parameter values comprises broadcasting the parameter values via separate physical connections between the memory interfaces and the corresponding rows and columns.

13. The method of claim 8, wherein broadcasting the parameter values comprises concurrently populating registers associated with the processor element arrays in the mutually exclusive subsets of the rows and columns with the parameter values.

14. The method of claim 8, wherein fetching the parameter values comprises accessing the parameter values via a memory fabric configured to interconnect with the memory that stores the parameter values.

15. A non-transitory computer readable medium embodying a set of executable instructions, the set of executable instructions to manipulate a computer system to perform a portion of a process to fabricate at least part of a processor, the processor comprising:
  processor element arrays distributed in rows and columns, wherein the processor element arrays are configured to perform operations on parameter values; and
  memory interfaces configured to broadcast sets of the parameter values to mutually exclusive subsets of the rows and columns of the processor element arrays;
  single-instruction-multiple-data (SIMD) units that comprise subsets of the processor element arrays in corresponding rows, and
  wherein the memory interfaces broadcast the parameter values to the SIMD units comprising the processor element arrays in rows associated with the memory interfaces;
  workgroup processors comprising subsets of the SIMD units, and
  wherein the memory interfaces broadcast the parameter values to columns of processor element arrays that are implemented across the SIMD units in the workgroup processors; and
  a memory fabric configured to interconnect with an external memory that stores the parameter values, and
  wherein the memory interfaces are configured to access the parameter values from the external memory via the memory fabric.

\* \* \* \* \*